United States Patent
Ratz (10) Patent No.: US 9,848,093 B2
(45) Date of Patent: Dec. 19, 2017

(54) METHOD FOR IDENTIFYING PRINT CONTROL ELEMENTS FOR QUALITY DATA ACQUISITION

(71) Applicant: HEIDELBERGER DRUCKMASCHINEN AG, Heidelberg (DE)

(72) Inventor: Georg Ratz, Kronau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 33 days.

(21) Appl. No.: 14/731,640

(22) Filed: Jun. 5, 2015

(65) Prior Publication Data

US 2015/0358488 A1 Dec. 10, 2015

(30) Foreign Application Priority Data

Jun. 5, 2014 (DE) .................. 10 2014 210 690

(51) Int. Cl.
*H04N 1/00* (2006.01)
*G06F 3/12* (2006.01)
(Continued)

(52) U.S. Cl.
CPC ....... *H04N 1/00045* (2013.01); *G06F 3/1208* (2013.01); *G06F 3/1256* (2013.01);
(Continued)

(58) Field of Classification Search
None
See application file for complete search history.

(56) References Cited

U.S. PATENT DOCUMENTS 4,671,661 A * 6/1987 Ott .................. B41F 33/0036
235/454
8,238,885 B2 8/2012 Mueller et al.
(Continued)

FOREIGN PATENT DOCUMENTS

DE 10 2006 050 409 A1 12/2007

*Primary Examiner* — Matthew Bella
*Assistant Examiner* — Brian Shin
(74) *Attorney, Agent, or Firm* — Laurence A. Greenberg; Werner H. Stemer; Ralph E. Locher (57) ABSTRACT

A method for identifying print control elements for quality data acquisition includes encoding position information in a human-readable identification code, encoding specific print job information and the human-readable identification code in a machine-readable data code, positioning the codes alongside their associated print control element on a printing substrate, photographing the printed print control element and adjacent machine-readable data code using information from adjacent identification code, and processing data with a mobile communication device having a camera function and communications interface. Image data produced are exporting to a support computer via the communications interface. Machine-readable data code are decoded, image data on the computer are analyzed using information obtained from decoded machine-readable data code, the results of analysis are transmitted from the computer to the mobile communication device, and erroneous settings, found by image analysis, in a printing press producing printed products, are corrected.

5 Claims, 5 Drawing Sheets

(51) Int. Cl.
*H04N 1/32* (2006.01)
*G06K 9/03* (2006.01)
*G06T 7/00* (2017.01)

(52) U.S. Cl.
CPC ........... *G06F 3/1285* (2013.01); *G06K 9/036* (2013.01); *G06T 7/0004* (2013.01); *H04N 1/00029* (2013.01); *H04N 1/00061* (2013.01); *H04N 1/00082* (2013.01); *H04N 1/00209* (2013.01); *H04N 1/00214* (2013.01); *H04N 1/00251* (2013.01); *H04N 1/32267* (2013.01); *G06T 2207/10004* (2013.01); *G06T 2207/30144* (2013.01); *H04N 2201/0005* (2013.01); *H04N 2201/0084* (2013.01); *H04N 2201/327* (2013.01); *H04N 2201/3271* (2013.01); *H04N 2201/3284* (2013.01)

(56) References Cited

U.S. PATENT DOCUMENTS

| | | | |
|---|---|---|---|
| 8,988,716 B1 * | 3/2015 | Odean | G06F 3/1238 358/1.14 |
| 2006/0280360 A1 | 12/2006 | Holub | |
| 2010/0309494 A1 * | 12/2010 | Platt | H04N 1/6033 358/1.9 |
| 2011/0085196 A1 * | 4/2011 | Liu | G06F 3/1204 358/1.15 |
| 2012/0182374 A1 | 7/2012 | Matsuda et al. | |
| 2012/0194874 A1 | 8/2012 | Milanski | |

* cited by examiner

METHOD FOR IDENTIFYING PRINT CONTROL ELEMENTS FOR QUALITY DATA ACQUISITION

CROSS-REFERENCE TO RELATED APPLICATION

This application claims the priority, under 35 U.S.C. §119, of German Patent Application DE 10 2014 210 690.7, filed Jun. 5, 2014; the prior application is herewith incorporated by reference in its entirety.

BACKGROUND OF THE INVENTION

Field of the Invention

The present invention relates to a method and an interface for the identification of print control elements for quality data acquisition.

The invention lies in the technical field of quality management.

The previous prior art includes two main areas. Firstly, there are the known methods for carrying out remote quality control in customer use. In that case, it has previously been customary for the larger printing presses to have integrated quality control, so that the printed products produced with those printing presses are automatically monitored for the desired quality during operation. For that purpose, stated simply, one or more cameras, which record the printed products produced once as an image or continuously, are fitted to the end of the printing line. The images produced in that way are either evaluated locally by the control computer of the printing press, which indicates defects found to the user through its display and operating elements, such as a touch screen or a display or, if the control computer of the printing press cannot perform those tasks, the image data recorded are forwarded over a network to an external computer and the evaluation is carried out there. The external computer then forwards the defects found to the operator of the printing press via a local display element or via an external display element connected by a network. Since those integrated systems require an increased financial outlay, they are normally used only in large and correspondingly expensive printing presses.

The second main area of the prior art is therefore represented by provisional solutions to which recourse has heretofore been made in the case of smaller and less expensive systems. For example, it is known from the prior art to check the print quality of such smaller printing presses on site by the use of small mobile measuring instruments, such as handheld densitometers. By using those mobile instruments, it is possible to examine both the printed products themselves and also the control elements, such as color measuring strips. A further procedure known from the prior art resides in scanning-in printed print control elements or image quality defects or in photographing the same by using a digital camera and then forwarding the images recorded in that way to the responsible support service by e-mail. However, all of those procedures have the disadvantage that the examinations described have to be carried out by trained service employees, for example of the printing press manufacturer, since, in particular in small print shops, the personnel there do not have the necessary specialist knowledge in order to correctly select and to examine the test objects to be measured.

In order to solve those problems, it is recommended to use commercially available camera-capable mobile telephones, with which the measuring locations of the printed products to be examined can be photographed and forwarded. Forwarding the data to the support center should preferably be done via the data interface of the mobile telephone. Such a method can also be carried out by normal users without relatively great specialist printing knowledge. However, there remains the difficulty in that case of the selection of the measuring locations to be examined and the procedural performance of the image recording, in order to obtain control recordings that can be evaluated by the support center. A further problem with that procedure is that the images recorded in that way can only be classified systematically with difficulty for a rapid and efficient, i.e. automatic, evaluation. That is because, in addition to general information about the time and location of the recording, information about the printing press (e.g. by using the serial number), the print job, type of print control element, the relative position of the print control element on the sheet, etc, are also necessary for automated evaluation. That information must be appended to the image recorded by the user, which firstly means an expenditure of time and secondly in turn requires technical specialist knowledge, which contradicts the actual aim of a simple method that can also be carried out without relatively great specialist knowledge.

SUMMARY OF THE INVENTION

It is accordingly an object of the invention to provide an economical method and interface for carrying out remote print quality analysis, which overcome the hereinafore-mentioned disadvantages of the heretofore-known methods and interfaces of this general type, which can be carried out by a user without specialist printing knowledge and in which all of the information necessary for carrying out the method is automatically acquired at the same time.

With the foregoing and other objects in view there is provided, in accordance with the invention, a method for the identification of print control elements for quality data acquisition, which comprises the following steps:

1. Encoding position information in a human-readable identification code;
2. Encoding specific print job information and the human-readable; identification code in a machine-readable data code;
3. Positioning the machine-readable data code and the identification code beside their associated print control element on the printing substrate;
4. Photographing the printed print control element and the adjacent machine-readable data code by using the information from the adjacent identification code, and processing the data with a mobile communication device with camera function and communications interface;
5. Exporting the image data produced to a support computer via the communications interface of the mobile communication device;
6. Decoding the machine-readable data code;
7. Analyzing the image data on the support computer by using the information obtained from the decoded machine-readable data code;
8. Transmitting the results of the analysis from the support computer to the mobile communication device; and
9. Correcting the erroneous settings, found by using the image analysis, in the printing press producing the printed products.

The machine-readable data code can include a QR code, a bar code, a data matrix code or similar data codes. In addition, it must be capable of being processed by using OCR methods known from the prior art.

In accordance with another preferred development of the method of the invention, in addition to the machine-readable data code (2) and the identification code (3), the copy (4) is also included in the quality data acquisition. This makes sense in particular when quality deficiencies surface only in the printed copy and not also in the print control element.

In accordance with a further preferred development of the method of the invention, the communications interface of the mobile communication device involves wire-free data transmission, in particular in accordance with a mobile radio standard. By using the data interfaces that are present in every commercially available mobile telephone with a camera nowadays, such as WLAN, Bluetooth or UMTS/LTE, the image recordings can be forwarded to a networked computer, which performs the evaluation. This can be in particular a server in the support center. In addition, the wire-free data transmission facilitates the data export to the support computer, since the photographed image data can be forwarded without using any additional hardware.

In accordance with an added preferred development of the method of the invention, in the event of failure of the communications interface, the image data is stored temporarily on the memory of the mobile communication device and exported at a later time. If the connection to the target server processing the images cannot be ensured at the time of recording, then the images can be stored temporarily and forwarded to the target server at a later time, i.e. as soon as the communications interface again permits a connection to the target server.

In accordance with an additional preferred development of the method of the invention, the functions of image recording, image processing and data export from the mobile communication device are controlled by an application program with graphic user interface that is active on the communication device. In order to simplify the performance of the method for the user, it is recommended to use an application program that is active on the mobile communication device, which automatically carries out the functions of image recording and processing and of the export to the target server, following prior configuration by the user. The application program can be operated by the user via a graphic user interface specifically matched to the requirements.

In accordance with yet another preferred development of the method of the invention, the application program that is active on the mobile communication device decodes the recorded machine-readable data code, carries out a prior analysis of the image data by using the information obtained in this way and indicates the result of the prior analysis via the user interface. When using the application program already described, it is expedient to have a prior analysis of the acquired image data carried out before the actual analysis on the target server, in order to give the user first information about the print quality obtained already. In this case, no complete analysis of the image data generated should be carried out, since there is a high probability that this will exceed the computing capacities of the basic hardware, that is to say of the mobile communication device. However, individual quality features which can be determined by the application program with relatively little outlay should be a constituent part of this prior analysis. This is recommended in particular when a connection to the processing computer or server is not possible at that time.

With the objects of the invention in view, there is also provided an interface having a code for the identification of print control elements, to carry out the method. The interface comprises a human-readable identification code and a machine-readable data code. The identification code includes specific information relating to the position of the print control element on the printing substrate. The machine-readable data code, on the other hand, includes both specific print job information and the identification code itself. Both codes are placed on the printing substrate beside the print control element about which they include specific information. However, they can also simultaneously be a constituent part of the print control element.

In accordance with another preferred development of the interface having a code of the invention, the identification code is composed of 4 parts, which include the relative position and the page of the printing substrate, information relating to the position of the print control element on the printing substrate in a zone transverse to the printing direction, information relating to the position of the print control element on the printing substrate in a sequence from the printing start along the printing direction, and the type of measuring instrument to be used. With this information, it is possible for the user to select the correct print control element for the image recording of the quality control.

In accordance with a further preferred development of the interface having a code of the invention, the machine-readable data code includes the type of print control element, the relative position and size in relation to the center of the print control element, the machine number of the printing press, the job number, the identification code, and the current date and clock time.

This information is needed for the automated evaluation of the image data in the support computer. Since the machine-readable data code is a constituent part of the photographed image data, forwarding the information to the support computer is thus ensured.

In accordance with a concomitant preferred development of the interface having a code of the invention, the machine-readable data code includes printing quality-relevant parameters including the speed, temperature, moisture content and the paper/substrate type. The inclusion of this information improves the possible detection of defects in the automatic evaluation by the support computer. Differing from the job-related information described in the previous development, this print-related information depends directly on the printing process and must therefore be appended on-the-fly by the printing press. Since this requires an expansion of the machine-readable data code during the printing, this procedure is primarily suitable for digital printing presses.

Other features which are considered as characteristic for the invention are set forth in the appended claims.

Although the invention is illustrated and described herein as embodied in a method for identifying print control elements for quality data acquisition and an interface having a code for identifying print control elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The method and functionally advantageous developments of the method will be described in more detail below with reference to the associated drawings by using at least one preferred exemplary embodiment.

DETAILED DESCRIPTION OF THE INVENTION

Figure 1:
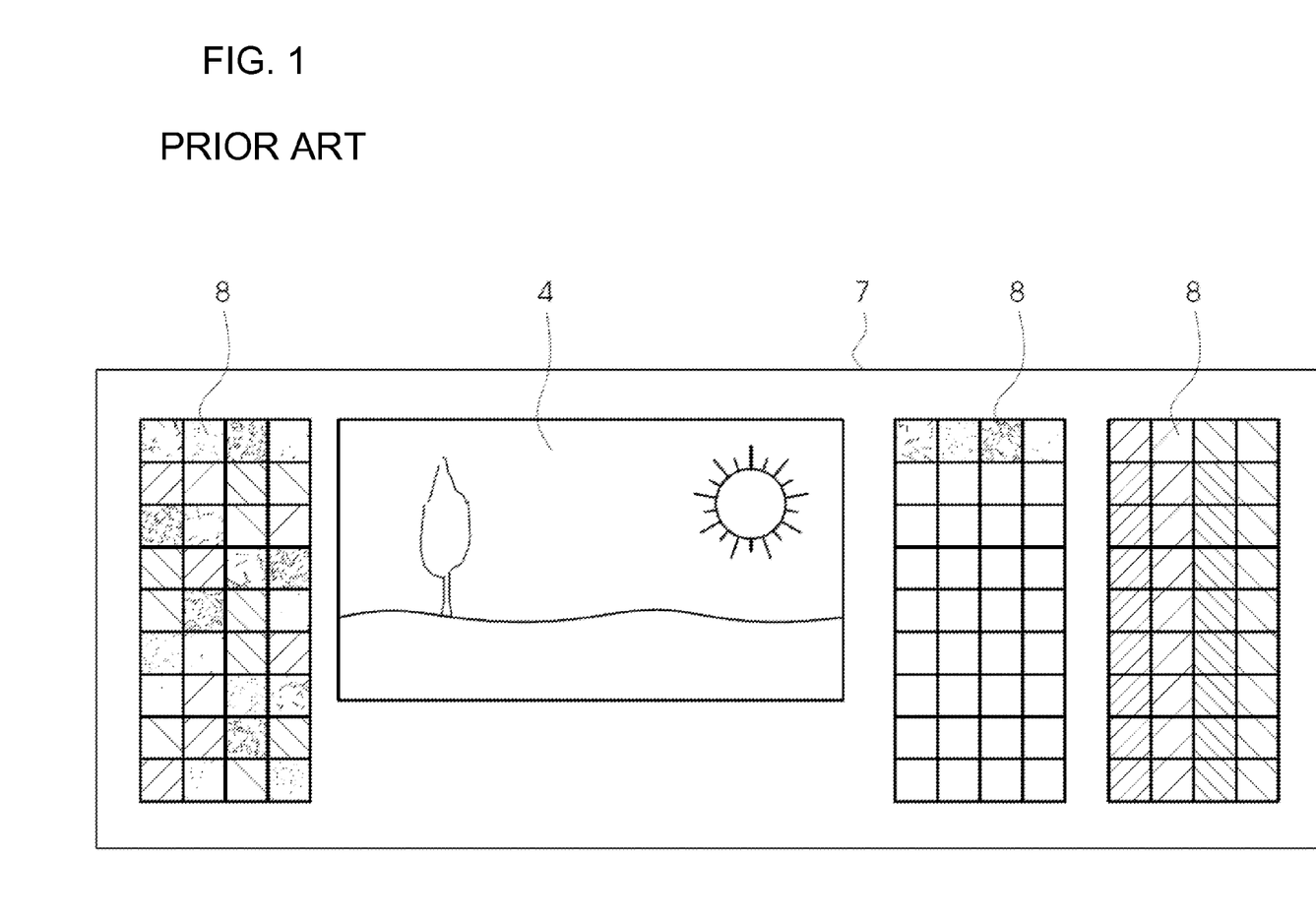
FIG. 1 is a diagrammatic, top-plan view of a printed sheet with prior art print control elements.

Referring now in detail to the figures of the drawings, in which mutually corresponding elements are each provided with the same designations, and first, particularly, to FIG. 1 thereof, there is seen an example of a printed sheet 7 with a copy or printed sheet section 4, in this case an image, and print control elements 8 disposed outside the copy 4, as is customary in the prior art. Which and how many print control elements 8 are placed on the sheet 7 depends on the copy 4, the type of printing process and the type of quality control. In automatic quality control systems, such as are integrated in larger printing presses 11, the control elements 8 are recorded by cameras and the images produced are either evaluated internally in the control computer of the printing press 11 or on an external server, and the results are displayed on a display. However, such large and costly printing presses 11 are not available, in particular in small print shops, the environment of which is illustrated by way of example in FIG. 5. For the smaller printing presses 11 which are used therein, an alternative procedure is necessary for reasons of cost.

Figure 4:
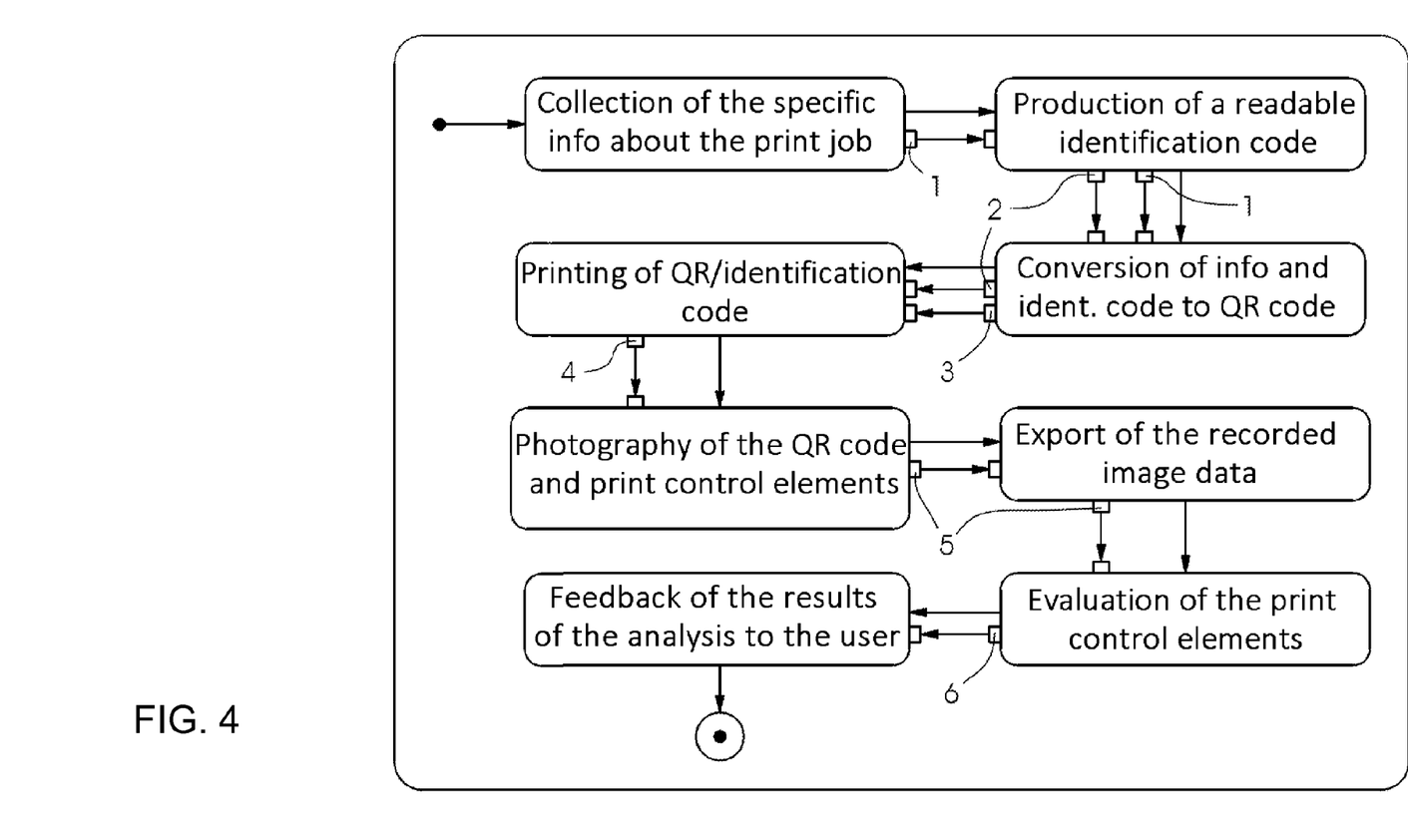
FIG. 4 is a flow diagram showing a preferred sequence of the method for quality data acquisition with identified print control elements.

In the preferred exemplary embodiment of the invention, the sequence of which is illustrated schematically in FIG. 4, each print control element 8 is assigned a human-readable identification code 3, with which the print control element 8 can be identified unambiguously over various printed pages. The identification code 3 includes information in order to be able to give a machine operator 9 orientation pointers as to how he or she should photograph the control element 8. The code 3 is composed of 4 parts:

a) the page, i.e. the relative number of the sheet 7+information about the front or rear side ("F"=front, "R"=rear);

b) an item of zonal Y information, transversely with respect to the printing direction, starting from the bottom sheet edge;

c) an item of alphanumeric X information, i.e. the relative number of the print control element 8 on the sheet 7 from the print start along the printing direction; and d) an item of information as to which type of measuring instrument (microscope camera ("M") or densitometer "D") is to be used.

In one example: 3R:4:F-M describes the print control element 8 on the rear or back side of the third sheet 7 in zone 4, element 6, which is to be recorded with a camera.

Figure 2:
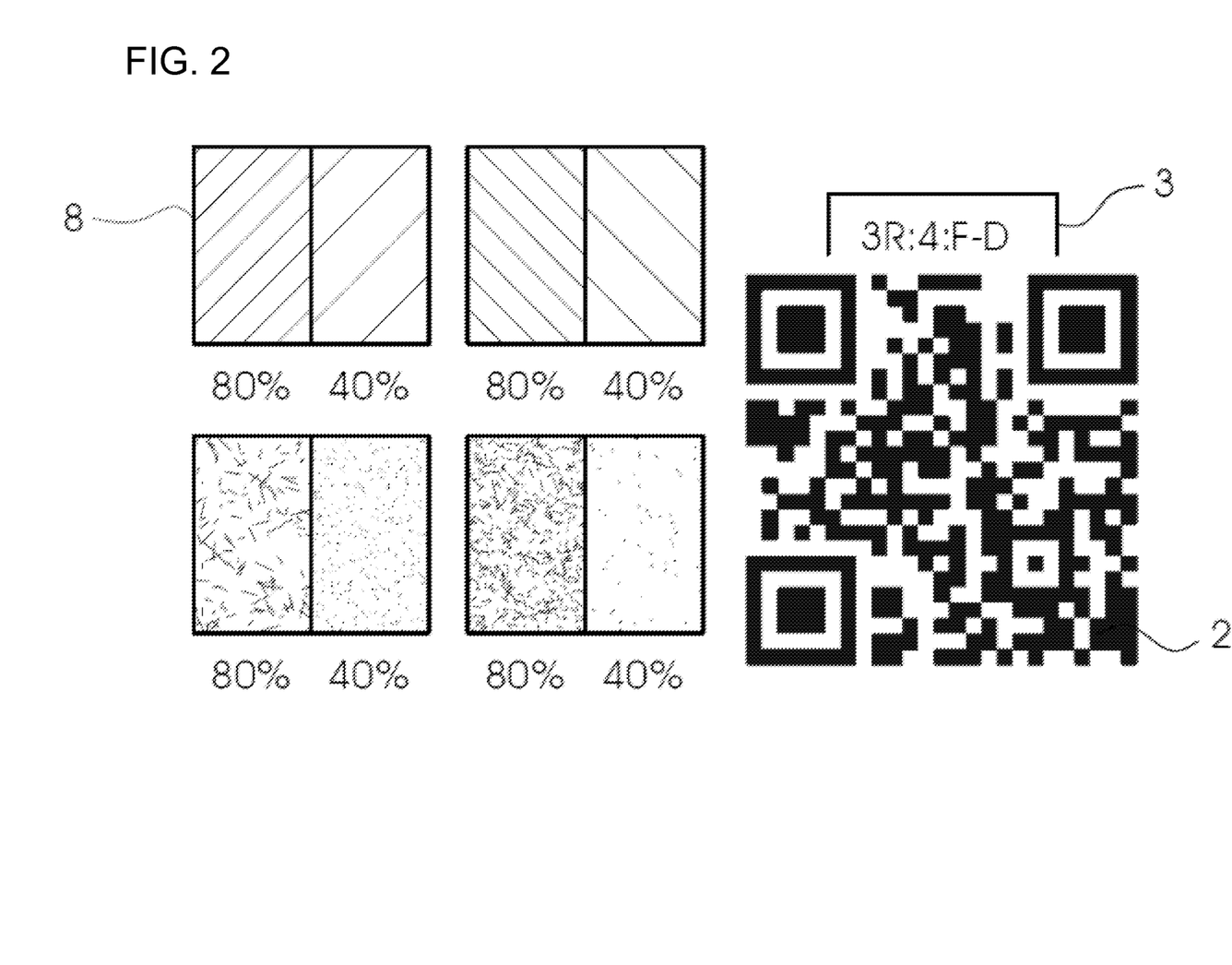
FIG. 2 is a top-plan view of a first example of print control elements with associated identification and machine-readable data code.
Figure 3:
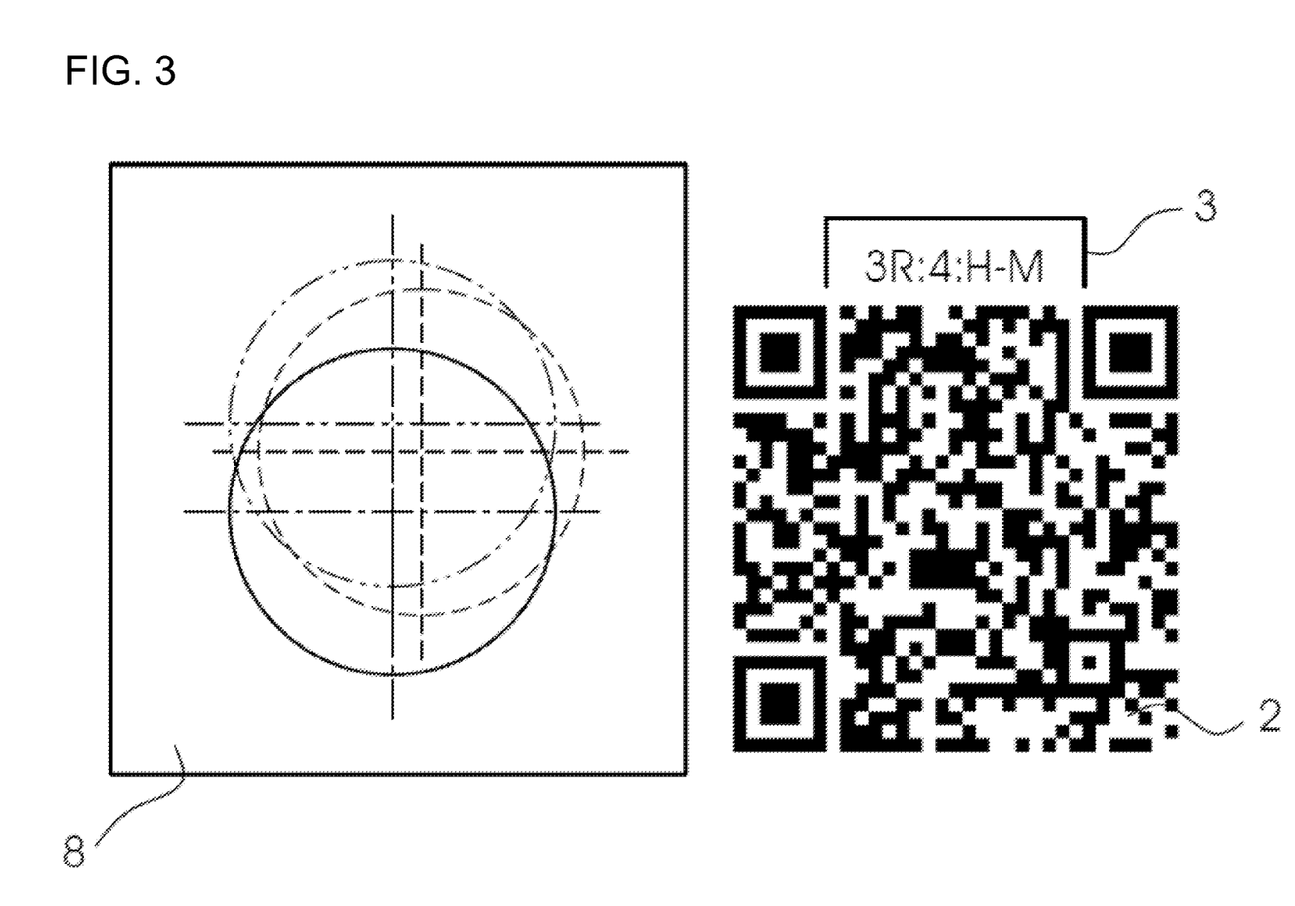
FIG. 3 is a top-plan view of a second example of print control elements with associated identification and machine-readable data code.

A machine-readable data code 2, which includes information 1 about the type of print control element 8, the relative position and size relating to the center of the machine-readable data code 2 and the machine number of the printing press, the job number (if known), the identification code 3 and the current date and the clock time, is placed under the identification code 3. The code 2 can include a QR code, a bar code or a data matrix code, for example, and must be readable by using known OCR methods. FIG. 2 and FIG. 3 show two examples of the configuration of the identification code 3 and the machine-readable data code 2 beside a print control element 8. In an alternative structural variant, it is additionally possible for the machine-readable data code 2 to be a constituent part of the print control element 8.

Setting up the identification code 3 and the machine-readable data code 2 for each print control element 8 is carried out within the context of setting up the prepress data of the print job.

In a further preferred exemplary embodiment, when using a digital printing press 11, further print quality-relevant parameters of the printing operation (e.g. speed, temperature, moisture content, paper/substrate type) are additionally appended to the machine-readable data code 2. Since most of these parameters are available only briefly, this must be done on-the-fly. To this end, the control computer of the printing press 11 collects this information and modifies the machine-readable data code 2 by appending the collected information thereto.

Figure 5:
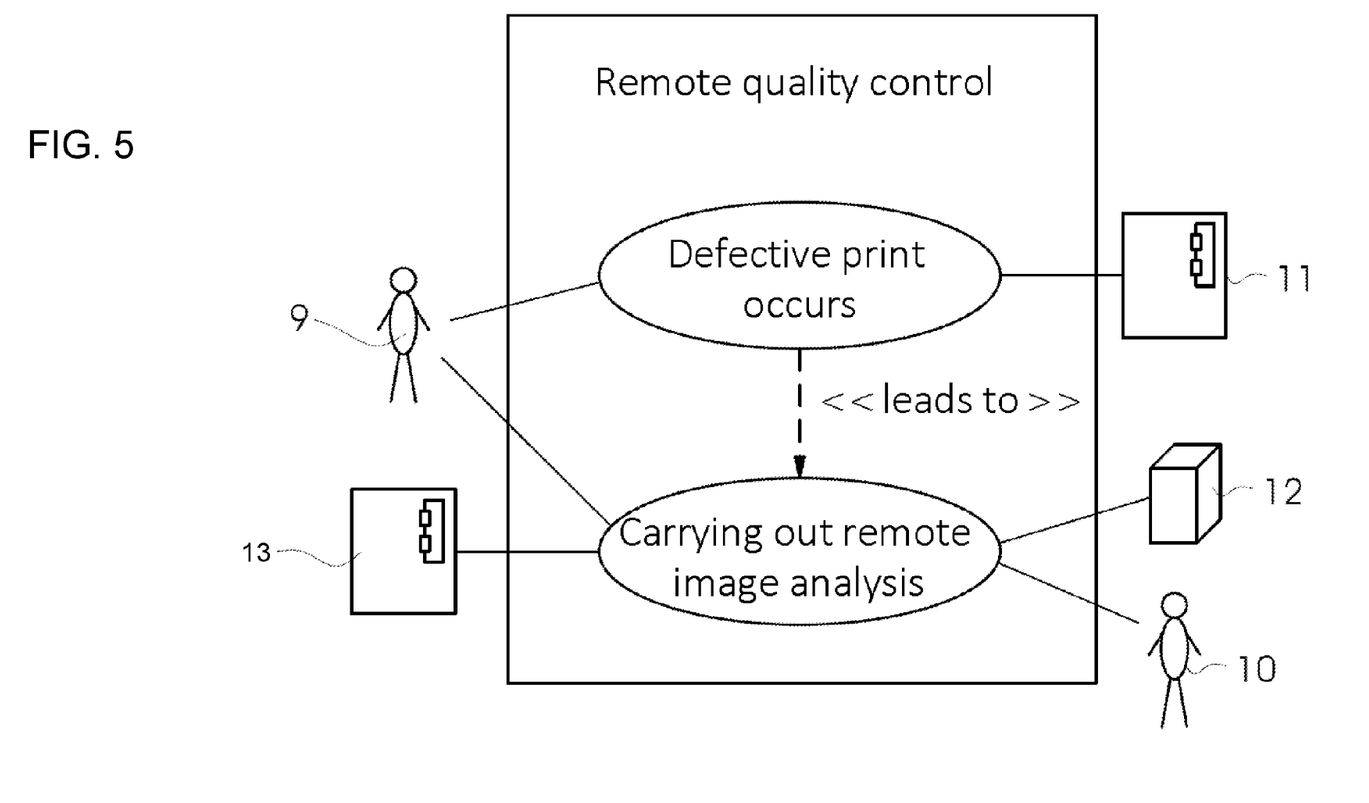
FIG. 5 is a diagram showing an application for the performance of remote quality control.

In the second step of the method according to the invention, during the processing of the print job, quality control is carried out at intervals defined by the user. The possible coverage reaches from performance only in the event of visible quality deficiencies in a copy as far as the inspection of every printed sheet 7. The decision relating to this lies with the user 9. If the user decides on performance, he or she uses a mobile communication device 13 with a camera function, that is to say for example a commercially available smart phone or tablet computer, to photograph the print control element 8 of the printed sheet 7 to be checked or printed sheet section or copy 4, as well as the associated machine-readable data code 2. The necessary position information can be gathered from the identification code 3. If the deficiencies that have occurred are present only in the copy 4 of the printed product, it is also possible for the relevant point of the copy also to be photographed. An image 5 produced in this way is forwarded over a wireless communications interface of the smart phone 13 to a computer 12 in a support center. The control of the camera of the smart phone 13 and the forwarding of the image data 5 produced are performed by an application program set up for this purpose, which runs on the smart phone 13. This application program is configured by the user 9 via a graphic user interface (GUI) with regard to environmental parameters (IP address, target server, etc). If the data of the copy 4 are also to be included in the analysis, the user 9 must likewise communicate this to the application program. In addition, depending on the embodiment, the program gives the user 9 help in configuration and application via the GUI. Next, the application program decodes the machine-readable data code 2 and links the information obtained in this way with the data of the image 4. Depending on the configuration, it is additionally capable of carrying out a prior analysis with regard to the printing quality of the image data 5 recorded, and of displaying the results to the user 9 together with the information from the machine-readable data code 2, via the GUI. In this case, the scope of the prior analysis with regard to which data are to be analyzed can be configured. The sense of such a prior analysis additionally depends highly on the computing power of the smart phone 13 being used. If it is too poor, the time expenditure for the prior analysis becomes too high or the gain in information which is possible in a tolerable time is too low. However, in particular for the case of an interruption of the data connection to the support computer 12, the prior analysis remains an important element to enable an estimate of the printing quality immediately for the user 9. In addition, in the event of an interruption of the data connection, the image data 5 is stored temporarily on the memory of the smart phone 13 and is then sent to the computer 12 in the support center after the data connection has been restored. Once the image data 5 has arrived in the support center, it is analyzed with the aid of the information relating to printing defects obtained from the machine-readable data code 2. Results 6 of the analysis, i.e. the printing defects found, together with possible causes, are then sent to the smart phone 13 via the still existing or yet to be restored data connection. In the smart phone 13, they are made available to the user 9 via the GUI of the application program. The user then has the possibility of making the necessary corrections to the settings of the printing press 11.

The invention claimed is:

1. A method for identifying print control elements for quality data acquisition, the method comprising the following steps:
   encoding position information in a human-readable identification code;
   encoding print job information and the human-readable identification code in a machine-readable data code;
   providing color measuring strips as the print control elements;
   positioning the machine-readable data code and the human-readable identification code adjacent each other and an associated color measuring strip on a printing substrate;
   processing the print job by printing the machine-readable data code, the human-readable identification code and the associated color measuring strip;
   photographing the printed color measuring strip and the adjacent machine-readable data code by using the information from the adjacent identification code, and processing the data with a mobile communication device having a camera function and a communications interface;
   exporting image data produced to a support computer over the communications interface of the mobile communication device;
   decoding the machine-readable data code;
   analyzing the image data on the support computer by using information obtained from the decoded machine-readable data code;
   transmitting results of the analysis from the support computer to the mobile communication device;
   correcting any erroneous settings, found by using the image analysis, in a printing press producing printed products; and
   controlling functions of image recording, image processing and data export from the mobile communication device by an application program with a graphic user interface being active on the mobile communication device, the application program being active on the mobile communication device decoding the recorded machine-readable data code, carrying out a prior analysis of the image data by using information thus obtained and indicating a result of the prior analysis via the graphic user interface.

2. The method according to claim 1, which further comprises including a copy in the quality data acquisition, in addition to the machine-readable data code and the identification code.

3. The method according to claim 1, wherein the communications interface of the mobile communication device involves wireless data transmission.

4. The method according to claim 3, wherein the wireless data transmission is carried out in accordance with a mobile radio standard.

5. The method according to claim 1, which further comprises temporarily storing the image data on a memory of the mobile communication device and exporting the image data at a later time, in the event of a failure of the communications interface.

* * * * *